United States Patent [19]

Swanson et al.

[11] 3,864,402

[45] Feb. 4, 1975

[54] PURIFICATION OF SECONDARY ALKYL AMINES

[75] Inventors: Ronald W. Swanson, Croton-on-Hudson; Edwin R. Kerr; William Smolin, both of Wappingers Falls, all of N.Y.

[73] Assignee: Texaco Inc., New York, N.Y.

[22] Filed: May 7, 1973

[21] Appl. No.: 358,236

[52] U.S. Cl. .......................................... 260/583 N
[51] Int. Cl. .......................................... C07c 85/16
[58] Field of Search ............................... 260/583 N

[56] References Cited
UNITED STATES PATENTS 3,131,221　4/1964　Remes et al. .................. 260/583 N

OTHER PUBLICATIONS

Chem., Berichte, Vol. 45, pp. 3,481–3,485.

*Primary Examiner*—Lewis Gotts
*Assistant Examiner*—D. R. Phillips
*Attorney, Agent, or Firm*—T. H. Whaley; C. G. Ries

[57] ABSTRACT

This invention concerns the separation and purification of secondary alkyl primary amines from mixtures comprising major amounts of contaminants, through the formation of secondary alkyl primary amine-carbon dioxide complexes which are preferentially extracted by inert solvents which are immiscible or partially immiscible with said mixtures and have poor solubility for the contaminants contained therein.

14 Claims, No Drawings

PURIFICATION OF SECONDARY ALKYL AMINES

This invention concerns the separation and purification of secondary alkyl primary amines from mixtures containing large quantities of paraffins and other non-"primary amine" contaminants such as nitroparaffins and carbonyl containing compounds.

More particularly, this invention relates to the separation and purification of secondary alkyl primary amines from mixtures containing said above-mentioned contaminants through the formation of secondary alkyl primary amine-carbon dioxide complexes and the selective extraction of said complexes with inert solvent systems having good solubility for said complexes and poor solubility for said contaminants, said solvents forming immiscible or partially immiscible phases with said contaminants when brought into contact with them.

BACKGROUND OF THE INVENTION

Amines may be regarded as derivatives of the hydrocarbons in which a hydrogen atom has been replaced by one or more amino groups. As a class amines have a very poor spectrum of applications. For instance, paraffinic amines have been used as antioxidants, as binders in the preparation or urea-formaldehyde resins, as catalysts and condensates in organic synthesis, as corrosion inhibitors, as detergents or surfactants, as plasticizers, as emulsifying agents, among many other uses.

The alkyl or paraffinic amines may be obtained by a number of processes including ammonolysis of alkyl halides, alkyl alkanols, aldehydes and ketones under heat and pressure, and by the hydrogenation of a number of nitrogen containing compounds. These nitrogen-containing compounds include nitriles, isonitriles, amides and most prevalently nitroparaffins. These latter substrates can usually be converted to amines by a number of catalytic hydrogenation procedures. Recently a large quantity of nitroparaffins have become available through the relatively large scale vapor and-/or liquid phase nitration of mixtures of normal paraffins using various combinations of nitrating agents including the oxides of nitrogen. These nitroparaffin mixtures are attractive as substrates for transformation to amines inasmuch as they are relatively inexpensive to obtain in crude form and lend themselves through hydrogenation to amines using various known reducing catalysts such as Raney nickel, palladium on carbon, nickel on diatomacious earth, stannous chloride, or zinc in the presence of hydrogen gas, usually under superatmospheric pressures. Unfortunately this nitration of normal paraffins not only produces the desired nitroparaffins, but dependent upon the "nitration" procedure used, can also produce concurrently a substantial quantity of undesirable contaminants or by-products such as polynitroparaffins, nitriles, halocarbons, ketones, alcohols, acids and oximes among others as well as a large quantity of unconverted paraffins (20–95 percent by weight) which may be present in large excess during most nitrations and which are also considered to be contaminants. While most of these contaminants do not appear to obstruct the formation of the desired secondary alkyl primary amines, they do complicate the separation and purification of the amine products.

While there is no paucity of processes for the separation and purification of amines, there appears to be a need for processes which can efficiently and selectivity remove the desired amines without resorting to fairly comprehensive and relatively costly pretreatment steps such as distillation into narrow boiling fractions from which the amines are recovered by further distillation. However, even in situations where the relatively high cost of distillation can be justified, the separation is complicated by the close and sometimes overlapping boiling points of the various amine isomers and the other non-amine components present in the hydrogenation mixture. For example, some of the vapor and liquid phase nitrations of high carbon number paraffins result in unreacted paraffins as well as polynitroparaffins, ketones, oximes and possibly (dependent upon the nitration process used) chlorinated paraffinics. The hydrogenation of these nitration mixtures can lead to complex mixtures containing the desired amine product as well as paraffins, nitroparaffins, ketones and other oxygenated compounds. In many instances these impurities or contaminants can have the same carbon number distribution. A potentially attractive separation and purification procedure broadly employs the formation of salts by contacting the hydrogenation mixture, preferably with an acidic reagent such as hydrogen chloride or carbon dioxide to form a non-volatile amine salt which can be separated by differential solubility from the non-amine contaminants and recovering the free amine by springing it with caustic material or heat. Hydrogen chloride and carbon dioxide are favored acidic reagents for this type of separation and purification process. For example, one prior art procedure utilized hydrogen chloride to form the amine hydrochloride, followed by extraction into water, separating the residual non-amines by steam distillation and "springing" the amine from the hydrochloride by treatment with alkali. Unfortunately, this process has several disadvantages in addition to a multiplicity of steps, namely the use of relatively costly equipment to resist the corrosive aqueous chloride ion, the fairly high cost of hydrogen chloride and the cost, storage and disposal of the alkaline material to spring the free amine.

Ostensibly the use of carbon dioxide as the acidic, salt forming reagent would appear to be advantageous over the use of hydrogen chloride. A recent prior art process is disclosed in U.S. Pat. No. 3,121,221 wherein a mixture containing at least one primary amine, at least one secondary amine and at least one tertiary amine is resolved into three separate classes. Carbon dioxide is passed into the amine mixture containing a non-polar solvent including propane, benzene and the like. The primary and secondary amines are said to precipitate as the corresponding alkyl ammonium carbamates and are separated from the solvent phase containing any tertiary amine by decantation, filtration or centrifugation, then fractionally crystallized from a secondary solvent, including the lower alkanols, ketones, ethers etc. into primary amine fractions and secondary amine fractions. After the fractionated alkyl ammonium carbamates are separated into their primary and secondary amine fractions, the free amines are sprung by treatment with an alkaline material such as alkaline earth metal or alkali metal hydroxide, carbonate, etc.

Unfortunately, as indicated by Example 1 of this application, for reasons not entirely clear, the above patented process is not applicable to applicants' random mixtures of secondary alkyl primary amines in which the amines present are either single carbon number compounds or mixtures of $C_{10}$ and higher compositions.

In view of these shortcomings of the prior art separation and purification procedures, a process was needed which could be utilized to separate and purify alkyl primary amines from such impurities as nitroparaffins, paraffins and carbonyl containing contaminants.

Ideally, an improved separation and purification process could be used on mixtures of paraffinic amines ranging in carbon content from 3 to 40 or higher either in neat form or in the presence of a wide range of background solvents including paraffins and aromatics, without the need for utilizing large quantities of alkaline material to spring the amine free, said process being utilizable either as a batch or continuous operation.

In general, paraffinic primary amines ($RNH_2$), wherein R is a straight chain or branched chain paraffinic (alkyl) radical of 3 to 40 or higher carbon atoms contained in a substantially anhydrous mixture containing impurities which are not primary amines, are separated and purified from said impurities by the formation of a primary paraffinic amine-carbon dioxide complex, employing the process consisting essentially of:

a. admixing with said mixture containing said primary amines and the impurities which are not primary amines (from which it is to be separated and purified), sufficient inert solvent system immiscible or partially miscible with said mixture to form a two phase reaction mixture of which the solvent phase has good solubility for said primary amine-carbon dioxide complex, the other phase having poor solubility for said primary amine-carbon dioxide complex;

b. contacting said admixed two phase reaction mixture with at least sufficient carbon dioxide to convert said primary amine present in said reaction mixture to primary amine-carbon dioxide complex, until substantially all of said complex is formed;

c. separating the complex-rich phase from the phase having poor solubility for said complex, and d. springing substantially all of said primary amine from said complex, and e. separating the solvent.

In the favored practice of this invention a minor amount of secondary paraffinic primary amine (in which the primary amine $NH_2$ group is located along a paraffinic chain) contained in a substantially anhydrous reaction mixture along with a major amount of paraffinic contaminant, and small quantities of nitroparaffins and/or polynitroparaffins and oxygenated contaminants such as ketones, oximes and the like, said paraffinic primary amines ranging in carbon content from $C_8$ to $C_{30}$, is separated and purified from said impurities by the formation of a secondary paraffinic primary amine-carbon dioxide complex, employing the process consisting essentially of:

a. admixing each part by weight of the mixture containing said primary amines, paraffinic contaminant and oxygenated impurities from which separation is desired, with 0.5 to 10 parts by weight of inert solvent system immiscible or partially miscible with said mixtue to form a two phase reaction mixture, of which the solvent phase has a greater solubility for said paraffinic amine-carbon dioxide complex than the paraffinic phase.

b. contacting said admixed two phase reaction mixture at temperatures ranging from about −20 to 100°C at carbon dioxide pressures ranging from at least one atmosphere and upward, and continuing said contact of primary amines with the carbon dioxide until substantially all of the primary amine present is converted to said carbon dioxide complex, c. separating the solvent-rich phase from the paraffin-rich phase, and d. springing substantially all of the primary amine contained in said carbon dioxide complex to produce a mixture of secondary alkyl (paraffinic primary amine and solvent, but substantially free of the original contaminants, e. separating the amines from the solvent by a process including distillation and decantation.

In the most favored practice, about 5 to 40 parts by weight of a mixture of secondary alkyl (paraffinic) primary amines ranging in carbon content from $C_{10}$ to $C_{25}$, contained in a mixture comprising from 95 to 60 parts by weight of a substantially anhydrous mixture of impurities including paraffins ranging in carbon content from $C_{10}$ to $C_{25}$ and from 0 to 6 parts by weight of nitroparaffins and/or polynitroparaffins and from 0 to 6 parts by weight of oxygenated compounds such as ketones and oximes are separated and purified from said mixture of impurities by the formation of a secondary paraffinic primary amine-carbon dioxide complex, using a process consisting essentially of:

a. admixing 100 parts by weight of the above mixture containing non-primary alkyl amines with from about 50 to 500 parts by weight of an inert solvent system, immiscible or partially miscible with said mixture, to form a two phase mixture, the solvent-rich phase of which has good solubility for said primary amine-carbon dioxide complex, the paraffin-rich phase having poor solubility for said primary amine-carbon complex, b. contacting said admixed two phase reaction mixture at temperatures ranging from about 15° to 50°C at pressures of carbon dioxide ranging from about 1 atmosphere to about 35 atmospheres until virtually all of the primary amine present is converted to said amine-carbon dioxide complex, c. separating the solvent-rich phase from the paraffin-rich phase, d. reducing the pressure, and e. heating the solvent-amine-carbon dioxide complex mixture to a temperature for a time sufficient to produce a solution of secondary alkyl primary amine substantially free of carbon dioxide and of the original contaminants, f. separating the amine from the solvent by distillation or a combination of distillation and decantation.

In order to aid in the understanding of the inventive concept, the following supplementary disclosure is submitted.

A. Amines - The amines whose separation and purification from contaminants such as paraffins, polynitroparaffins, nitriles, halocarbons, ketones and oximes comprise secondary alkyl primary amines, containing from 3 to 40 carbon atoms and higher, and which are included within the formula:

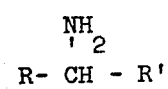

where R and R' which can be the same or different at any given time, are alkyl radicals whose sum preferably totals 9 to 24 carbon atoms. These amines with this range of carbon numbers are preferred because they are available as inexpensive mixtures such as $C_{10}$ to $C_{14}$ from varied sources but primarily because they lend themselves to separation in good yield and free from contaminants using the inventive process. Illustrative secondary alkyl primary amines which can be present as single discrete compounds or mixtures, include among many other: 2-aminobutane, 2-aminopentane, 2-amino-2-methylbutane, 5-aminoheptane, 2-aminodecane, 6-aminododecane, 5-aminotridecane, 2-aminotridecane, 3-aminotetradecane, 5-aminotetradecane, as well as mixtures thereof.

B. Contaminants - The contaminants from which the above secondary alkyl primary amines are to be separated vary dependent upon the precursor process employed to produce the secondary alkyl primary amines, the resultant contaminants which are produced concurrently with the desired products, and contaminants which are present in the materials charged to the amine-producing process. Use of relatively impure charge materials may be economically advantageous provided the impurities can be readily removed from the amine product as by the present separation and purification process. Secondary alkyl primary amines may be formed by a number of reactions in which the principal product impurities include unreacted charge materials and secondary and tertiary amines. For example, amines may be prepared by:

1. the Hoffman reaction of an amide with a hypochlorite or hypobromite (or corresponding mixture of a halogen and base) giving unreacted amide and possibly alkyl isocyanate intermediates as contaminants, or by
2. alkylation of ammonia with alcohols or alkyl halides giving secondary and tertiary amines as well as unreacted alcohol or alkyl halide as contaminants,
3. by reduction of paraffins having nitrogen-containing substituents such as oximes, alkyl cyanides, or nitroparaffins giving secondary and tertiary amines plus unreacted charge materials as contaminants, and by
4. other methods known in the art.

C. Inert Solvent(s) or Inert Solvent Systems. These terms as defined throughout this disclosure relate to hydroxylated paraffinic hydrocarbons containing 1 to 2 hydroxyl groups per molecule, or mixtures thereof with water, which must meet the following requirements to be acceptable:

1. It must be inert to reaction with carbon dioxide or any of the components of the amine-containing mixture at conditions used in the separation, which generally include temperatures ranging from about $-20°C$ to $100°C$ and carbon dioxide pressures varying from ambient (0 psig) to about 500 psig.
2. It must be relatively immiscible with the mixture of the amine impurities as well as paraffins, at the above described reaction conditions. By relatively immiscible we mean that no more than about 10 percent by weight of the inert solvent such as methanol will dissolve in a typical solution comprising for example 85 percent by weight $C_{10}$ to $C_{14}$ paraffinic mixtures and 15 percent by weight of a secondary alkyl primary amine mixture.
3. It must have a highly favorable solubility distribution for the secondary alkyl amine-carbon dioxide complex compared to the contaminants such as are illustrated by the above 85 percent by weight $C_{10}$-$C_{14}$ paraffins to 15 percent by weight secondary alkyl primary amine mixture. By favorable we mean that between 15° and 30°C at 15 psig, one or more parts by weight of complex will dissolve in the inert solvent for each part dissolving in the contaminant mixture phase. What constitutes a sufficient amount of inert solvent obviously will vary from solvent to solvent. The favored inert solvents are the lower alkanols containing 1 to 4 carbon atoms, their mixtures, neat, or combined with varying amounts of water. The inert solvent most favored is methanol containing from about 0 to 70 percent by volume of water. In addition to the lower alkanols, other hydroxylated paraffinics meeting the criteria set forth supra can be employed. These include saturated aliphatic (paraffinic) diols such as ethylene glycol, propylene glycol, butylene glycol, trimethylene glycol, diethylene glycol, dipropylene glycol, etc. Again, these can be employed combined with these diols and alkanols disclosed previously, neat, and/or combined with 0 to 70 percent by volume of water. The water content of any single alkanol or diol or mixtures of these will vary according to variable factors such as the amine to be recovered and the impurities from which the amines are to be recovered.

D. Amount of Carbon Dioxide Required - The quantity of $CO_2$ needed to most effectively achieve the desired separation of "primary" amine is defined as that required to form the primary amine-$CO_2$ complex in substantial amounts. A substantial amount as used herein refers to conversions of at least 50 percent, preferably from 75 to 90 percent or higher of "primary amine" to the $CO_2$-amine complex. While no reaction mechanism is postulated, nor is patentability predicated upon the assignment of a name or structure to the "primary amine-$CO_2$" complex, for each mole of amine present the amount of $CO_2$ used should be at least 0.5 moles. Inasmuch as the amount of $CO_2$ required varies with the extractant solvents employed, the quantity of impurities and solvent present, relative to the amines, the temperature at which $CO_2$ is added, and the pressure at which $CO_2$ is added, the precise quantity of $CO_2$ cannot be stated in absolute terms. However, at $35°-50°C$ and 300-500 psig of carbon dioxide, where methanol-water is the extractant used and a reaction mixture containing a mixture of $C_{10}$-$C_{15}$ secondary alkyl primary amines is employed, about 5 moles of $CO_2$ are used per mole of amines present. The addition of $CO_2$ can be accomplished by either separately treating the methanol and/or reaction mixture with $CO_2$ prior to mixing them or by treating the reaction mixture already containing methanol (or any of the other solvent extractants) with $CO_2$. The only requirement is to maintain the necessary pressure of $CO_2$ in the gas phase, and to allow sufficient time for the liquid to absorb the required amount of $CO_2$. It is preferred that the amount absorbed be close to that corresponding to equilibrium with the gas. While $CO_2$ alone is preferred because of the lower total pressures needed and the shorter reaction time cycle, as much as 90 percent of inert gases such as nitrogen can be employed if additional reaction time and higher total pressures are provided. As stated previously, because of process variables the pressures at which the $CO_2$ is added cannot be stated with precision but generally $CO_2$ partial pressures of 0 to 500 psig can be used.

E. Sequence of adding Inert Solvent and Carbon Dioxide -

The inventive process can be run using 3 variations: In the favored practice, a mixture of secondary alkyl primary amines in which the carbon chains of the amines contain from 10 to 25 carbon atoms, contained in an appropriately sized reactor, capable of being pressurized, agitated, heated and cooled and equipped with a means of withdrawing samples of the reaction mixture, is treated with carbon dioxide at elevated temperatures and pressures until at least a sufficient quantity of carbon dioxide is passed into the agitated reaction mixture to form a substantial quantity of amine-carbon dioxide complex, then contacting said reaction mixture containing said complex with $CO_2$- saturated solvent until a two phase system comprising an amine-rich solvent phase and a phase containing the impurities but depleted in amines is formed and springing the amine in a form substantially free from contaminants.

In a second procedure, the inert solvent immiscible or partially miscible with the reaction mixture is added to the reaction mixture (in sufficient quantity to form two phases) prior to contacting the reaction mixture with carbon dioxide. Then as described above, carbon dioxide is added to the agitated reaction mixture until it is substantially saturated to form the "amine complex" and the reaction is terminated as before to yield the two phase system. Once again the phase rich in amine-$CO_2$ complex is separated and the free amine is sprung substantially free from contaminants.

A third less favored variation is to substantially saturate the reaction mixture free from extractant with carbon dioxide and after terminating the $CO_2$ addition, then extracting with the inert solvent which contains no carbon dioxide or less than a saturating amount.

No matter what sequence of addition of inert solvent extractant to reaction mixture is followed, it should be noted that multiple extractions of the initial raffinate may be made using fresh extractant or reprocessed extractant. However, while relatively more amine can be extracted from the raffinate, the efficiency of the first extraction with either methanol or methanol and water, makes subsequent extractions economically less attractive.

F. Springing (Recovery of) Secondary Alkyl Primary Amines from Carbon Dioxide Complex. After separating the extractant phase containing said primary amines the amine-$CO_2$ complex can be easily decomposed by reducing pressure to atmospheric and by heating at temperatures ranging from about 60° to 150°C or by a combination of depressuring, heating and stripping off $CO_2$ with an inert gas such as nitrogen at pressures of 0 to 20 psig.

G. Separation of Amine from Solvent - The method of separating the amine from the solvent will vary with the solvent used but will usually include distillation or a combination of distillation and decantation.

H. Continuous Process versus Batch Methods - The novel separation and purificaton procedure can be carried on in both batch and continuous methods. In the former procedure the $CO_2$ addition to the reaction mixture terminates with saturation, then the $CO_2$ saturated liquid extractant is added to the reaction mixture, agitated, and the "primary amine" separated from the residuum of the reaction mixture. This extraction can be repeated until analytical data indicates further extraction is impractical.

In a typical continuous operation the extracting inert solvent would be passed countercurrent to the amine-containing mixture in a solvent extraction column. Each of the feeds would be saturated with $CO_2$* at the column temperature and pressure. The addition of $CO_2$ could be done in any standard type of absorption apparatus, such as a packed tower, sieve tray column, line mixer, etc. or if desired could be carried out in the extractor simultaneously with the extraction. For very high purity product, the extract phase can be countercurrently treated with a light paraffinic ($C_5$-$C_9$), either cyclic or alkane, to remove traces of impurities from the extract phase.

I. Preferred Process - Where the alkyl group of the secondary alkyl primary amine contains $C_{16}$ to $C_{25}$ or higher carbon number primary amines, and the charge contains from about 10 to 30 percent by weight of said amines, a methanol water extractant (containing about 0 to 60 percent by weight of water) saturated with $CO_2$ is the preferred extractant used to contact the amine phase previously saturated with $CO_2$, with both saturation* and contacting carried out at temperatures ranging from 15° to 50°C and pressures ranging from 100 to 500 psig. The preferred weight ratio of solvent to amine mixture under these conditions varies from 1 to 5 parts by weight of solvent for each part by weight of amine mixture including impurities such as paraffins.

*Or if not saturated with $CO_2$ would contain enought $CO_2$ to convert all the secondary alkyl primary amine to the desired complex.

Where the alkyl group of the secondary alkyl primary amine contained in the $CO_2$ saturated reaction mixture contains 3 to 15 carbon atoms a methanol-water extractant is preferred, wherein the water content of the solvent varies between 10 to 70 weight percent. The preferred amount of solvent under these conditions varies from 1 to 3 parts by weight of solvent for each part by weight of amine mixture.

J. The analytical methods employed to measure the effectiveness of the separation process vary according to the experiment involved and the components to be analyzed. Primarily gas chromatography (g.c.), titration of the total base, and infra-red analysis can be employed to establish the amounts of amines and impurities which are present.

In order to disclose the inventive process in the greatest possible detail, the following illustrative examples are submitted. Unless indicated otherwise all parts and percentages are by weight and all temperature measurements are in degrees Centigrade rather than degrees Fahrenheit.

EXAMPLE 1

UNSUCCESSFUL ATTEMPT TO SEPARATE SECONDARY ALKYL PRIMARY AMINES FROM REACTION MIXTURE CONTAINING PARAFFINICS WITHOUT UTILIZING INERT SOLVENT EXTRACTANT

Part (A) A glass flask equipped with means for heating, cooling and agitating a reaction mixture and a sparger for $CO_2$ addition to said reaction mixture and designed to permit the withdrawal of samples during the reaction is charged as follows:

The charge comprises 15 percent by weight of a random mixture of $C_{13}$ secondary alkyl primary amine isomers and 85 percent by weight of tridecane. The reactor solution is agitated and flow of carbon dioxide at 15 psia started at 23°C. Within 10 minutes the temperature of the contents of the flask rises by 7°C, indicating that reaction is occurring. However, after cooling and venting off pressure, the reaction mixture exhibits no phase separation at all.

Part (B) In a similar run, 15 percent by weight of $C_{10}$-$C_{20}$ secondary alkyl primary amines in 85 percent by weight of tridecane can be treated with $CO_2$ gas at 15 psia pressure until saturation at 25°C without obtaining two phase systems.

Inasmuch as the solvent media and reaction conditions closely approach those used in U.S. Pat. No. 3,131,221 (which we believe to be the closest prior art), it would appear to follow that the sole difference of substance is that applicants' secondary alkyl primary amine mixture in contrast to the patentee's specific n-primary amines, do not lend themselves to the prior art process of U.S. Pat. No. 3,131,221, unless the addition of applicants' inert solvent extractant is made to the reaction mixture of the amine-$CO_2$ complex. For reasons presently unclear, the use of solvent facilitates both the separation and purification of secondary alkyl primary amines from reaction mixtures, particularly those containing major amounts of paraffinic solvents.

EXAMPLE 2

SUCCESSFUL SEPARATION AND PURIFICATION OF SECONDARY ALKYL PRIMARY AMINES FROM REACTION MIXTURE OF PARAFFIN AND $C_{13}$ SECONDARY ALKYL PRIMARY AMINES BY SUBSEQUENT EXTRACTION WITH METHANOL SATURATED WITH $CO_2$

In this procedure 100 parts by weight of a mixture of $C_{13}$ secondary alkyl primary amine (15 percent by weight) and tridecane (85 percent by weight) as in Part A, Example 1, is saturated with $CO_2$ and is treated subsequently with 50 parts of neat methanol previously saturated at 25°C with $CO_2$ at atmospheric pressure, and the mixture is vigorously agitated. Two phases are produced. Based on gas chromatograph analysis of the amine-$CO_2$ complex-rich methanol phase, the purity of the $C_{13}$ amine in the methanol is above 65 percent by weight on a methanol and $CO_2$ free basis and the amine recovery in the extract phase is above 90 percent of that in the starting paraffin.

EXAMPLE 3

SEPARATION AND PURIFICATION OF A $C_{13}$ SECONDARY ALKYL PRIMARY AMINE FROM A PARAFFINIC REACTION MEDIA CONTAINING EXTRACTANT PRIOR TO $CO_2$-AMINE COMPLEX FORMATION

The reaction mixture similar to that used in Example 1 is treated with $CO_2$ at 25°C in the presence of methanol amounting to 50 percent by weight of the amine-paraffin mixture (15 percent by weight of $C_{13}$ amines and 85 percent by weight of tridecanes). After the $CO_2$ addition has been terminated and the reaction mixture processed as in Example 1 (Part A) two layers form and are separated at 18°C. When analyzed by gas chromatography, the amine concentration in the methanol rich extract phase is about 22 percent by weight and only 2.6 percent by weight of amine is found in the paraffin-rich phase, both on a $CO_2$-free basis. The amine purity in the extract phase is about 68 percent by weight on a methanol and $CO_2$-free basis and the amine recovery in the methanol extract phase is about 93 percent of that in the starting paraffin.

EXAMPLE 4

SEPARATION AND PURIFICATION OF MIXED $C_{10}$-$C_{14}$ SECONDARY ALKYL PRIMARY AMINES USING ALKANOL-WATER MIXTURES AS EXTRACTANT FOR THE AMINE-$CO_2$ COMPLEX

Part A. Using a contacting apparatus suitable for high pressure operation, an agitated mixture of 45g of $C_{10}$-$C_{14}$ secondary alkyl primary amines and 255g of undecane is contacted with an equiweight mixture of methanol (124g) and water (124g) at 44°C under a carbon dioxide pressure of 500 psig. After about 30 minutes the agitation is discontinued and the two phases separate. On a carbon dioxide-free basis, the extract of water-methanol rich in amine-$CO_2$ complex contains about 13 percent by weight amines and 0.7 percent by weight undecane while the raffinate phase contains about 3 percent by weight amines and about 97 percent undecane.

Part B. Using the techniques described above in Part A 15.1g of the $C_{10}$-$C_{14}$ sec.alkyl primary amine of Part A, and 85.2g of undecane is contacted with an agitated mixture of methanol 8.1g, ethanol 76.0g, and water 16.3 g, and saturated with $CO_2$ at 15 psia at ambient temperature. At the end of this time both the $CO_2$ flow and agitation are terminated and the alkanol phase rich in amine-$CO_2$ complex is separated from the paraffin-rich phase at 24°C. As in Part A, a favorable distribution of amine to paraffin is present in the alkanol phase compared to the paraffinic phase, the alkanol phase containing about 60 percent amines relative to paraffin while the paraffin phase contains about 2% amine relative to paraffin. About 83 percent of the amine appears in the extract phase.

Part C. Using the apparatus, techniques of Part B, a mixture of 15.1g of $C_{10}$-$C_{14}$ secondary alkyl primary amines and 85.5g of undecane is contacted with an agitated mixture of water (39.6g) and isopropanol (90.5g) to form a reaction mixture. The reaction mixture is saturated with $CO_2$ at an atmospheric pressure at ambient temperature until the exothermic reaction is completed. At the end of this time, the two phases are allowed to separate (26°C) and again a favorable distribution of amine (calculated on a $CO_2$-free basis) is obtained in the alkanol mixture phase compared to the paraffinic raffinate. The alkanol phase contains about 53 percent amine relative to paraffin while the paraffin phase contains about 4 percent amine relative to paraffin. About 70 percent of the amine appears in the extract phase.

Part D. Part C is repeated exactly except that a mixture of methanol (60g), isopropanol (30g) and water (15g) is used to extract the 15g of $C_{10}$-$C_{14}$ secondary alkyl primary amines from the background solvent of 85g of undecane. Once more the agitated $CO_2$-saturated reaction mixture is allowed to separate into two phases, the alkanol water phase rich in amine-$CO_2$ complex and the primarily paraffinic phase. Analysis (g.c.) indicates that over 50 percent of the amine (calculated as $CO_2$ free) is distributed in the alkanol-water-phase.

EXAMPLE 5

ATTEMPTED SEPARATION OF MIXED $C_{10}$-$C_{14}$ SECONDARY ALKYL PRIMARY AMINES USING ALKANOLS AND ALKANOL-WATER EXTRACTANTS BUT WITHOUT PREPARING THE $CO_2$ AMINE COMPLEX

Parts A, B, C and D of Example 4 employing respectively methanol-water, methanol-ethanol-water, and isopropanol-water and methanol-isopropanol-water are repeated using the same technique and quantities of amine and undecane as in Example 4. However, no carbon dioxide is employed. For exxample, in the run corresponding to Part A of Example 4, the methanol-water extract contains only about 1 percent by weight of amine while the amine in the raffinate is about 14 percent by weight. In the run corresponding to Part B of Example 4, only about 52 percent of the amine appears in the extract phase. In the run corresponding to part C of Example 4, only about 38 percent of the amine appears in the extract phase. Similar results are obtained when Part D is repeated without $CO_2$.

These results show that the amine-$CO_2$ complex is much more effectively extracted by the proposed alkanol-water solvents than the amines themselves in the absence of $CO_2$.

EXAMPLE 6

IMPROVED SEPARATION AND PURIFICATION OF MIXED $C_{10}$-$C_{14}$ SECONDARY ALKYL PRIMARY AMINES USING METHANOL-WATER AS EXTRACTANT WHEN N-HEPTANE IS PRESENT AS THE BACKGROUND SOLVENT

The procedure of Example 4 Part A is followed exactly except that the 45g of $C_{10}$-$C_{14}$ secondary alkyl primary amine is dissolved in a synthetic reaction mixture consisting of 118g of n-heptane and 118g of undecane rather than 225g of undecane. The agitated reaction mixture is treated with $CO_2$ at a pressure of 500 psig at a temperature of 44°C. After about 30 minutes the agitation is discontinued and the mixture separates into two phases. The concentration of amines in the methanol extract phase is about 12 percent by weight while the raffinate phase contains about 7 percent by weight, both calculated on a $CO_2$-free basis. The purity of the amine in the methanol extract on a solvent, $CO_2$, and heptane-free basis is about 99% by weight compared to a purity of about 95 percent by weight in Example 4 (Part A) when no heptane is employed. The above results establish improved selectivity in the presence of a relatively low molecular weight paraffinic counter solvent.

EXAMPLE 7

SEPARATION OF MIXED $C_{10}$-$C_{14}$ SECONDARY ALKYL PRIMARY AMINES FROM UNDECANE USING DIFFERENT RATIOS OF METHANOL-WATER EXTRACTS UNDER MODERATE $CO_2$ PRESSURES

Part A. The procedure of Example 4, Part A is followed except that the agitated reaction mixture comprising 45g of a mixture of $C_{10}$-$C_{14}$ secondary alkyl primary amines and 225g of undecane is contacted with a methanol-water extractant solvent consisting of 207g methanol and 23g of water (a 10:1 ratio of methanol to water) and the $CO_2$ is added to the reaction mixture at 100 psig (compared to 500 psig pressure used in the run of Example 4). The methanol water extract phase has an amine concentration of about 17 percent by weight (calculated on a $CO_2$-free basis) while the raffinate (paraffinic) phase has an amine concentration of about 2.5 percent by weight when calculated on a $CO_2$-free basis.

Parts B through D of Example 4 also give favorable amine distribution patterns between aqueous alkanol and paraffinic (raffinate) phase when other ratios of water to alkanol are used.

EXAMPLE 8

SEPARATION AND PURIFICATION OF $C_{10}$-$C_{14}$ SECONDARY ALKYL PRIMARY AMINE MIXTURES FROM REACTION MIXTURES CONTAINING NITROPARAFFIN, KETONE, OR SECONDARY ALKYL SECONDARY AMINE IMPURITIES

Using the procedure, equipment and techniques of Example 4, Part A, different mixtures containing 45g secondary alkyl primary $C_{10}$-$C_{14}$ amines, 255g undecane, 248g of a 50 percent water, 50 percent methanol mixture, and either 10g of $C_{10}$-$C_{14}$ secondary alkyl secondary amine, 10g of $C_{12}$ nitroparaffin or 10g of tridecanone-2 are treated with carbon dioxide at 43°C and 500 psig pressure of $CO_2$. In each case two phases form after stopping agitation. Semi-quantitative analyses by g.c. show that over 73 percent of the amine is in the methanol phase whereas at least 66 percent of nitroparaffin, ketone, or secondary amine, originally in the reaction mixture is in the paraffinic phase. This example demonstrates the efficiency of the inventive process under difficult circumstances.

EXAMPLE 9

THERMAL SPRINGING OF SECONDARY ALKYL PRIMARY AMINE FROM METHANOL RICH-PHASE CONTAINING THE AMINE-$CO_2$ COMPLEX AND PARAFFIN

An extract phase containing methanol, tridecane and $CO_2$ complex of $C_{13}$ secondary alkyl primary amines is derived from the extraction of a $CO_2$-amine complex-paraffin mixture with neat methanol. The extract contains methanol, amine and paraffin in the percentages shown below and is heated to 120°C in a flask with slow nitrogen flow for 3 hours. The methanol phase contains 25 cc of $CO_2$, measured at standard temperature and pressure, per gram of sample. At the end of the heating time no $CO_2$ or methanol remains in the sample. Some tridecane is also lost by vaporization. In the mixture the concentrations of amines, methanol, and tridecane, before and after heating, are shown below:

| % by weight ($CO_2$-free basis) | Before Heating | After Heating |
|---|---|---|
| Methanol | About 66% | 0 |
| $C_{13}$ secondary amine | About 23% | About 71% |
| Tridecane | About 11% | About 29% |

EXAMPLE 10

THERMAL SPRINGING OF SECONDARY ALKYL PRIMARY AMINE FROM A METHANOL-WATER PHASE CONTAINING THE AMINE-$CO_2$ COMPLEX

A blend of the methanol-water extracts produced by methanol-water extraction of a $C_{13}$amine-$CO_2$ complex - tridecane mixture containing about 3 ml of $CO_2$/g of sample at standard temperature and pressure and totalling 1375 ml by volume is subjected to fractional distillation at atmospheric pressure. About 1044 ml overhead is taken; the final pot temperature is 106°C. After terminating the distillation the bottom product is cooled and withdrawn. It separates into two phases, 81.4g of top phase and 232.3g of bottom phase. The top phase is predominantly amine containing only 0.06 ml $CO_2$/g. The bottom phase is predominantly water and contains no $CO_2$.

EXAMPLES 11 to 36

SEPARATION OF VARIOUS AMINE-CONTAMINANT MIXTURES USING ALKANOL-WATER SOLVENTS WITH AND WITHOUT FORMATION OF A $CO_2$ COMPLEX

Using the techniques described in Examples 4 and 5, runs are made at 15 psia, with the designated amine substrates, diluents, and solvent systems shown in Table I, below. These Examples show the wide range of applicability of the instant process and further illustrate the enhanced selectivity obtained by the combination of $CO_2$ complex formation and solvent extraction.

provides an efficient method for separating and purifying the desired secondary alkyl primary amines in the presence of major amounts of paraffinic contaminants having the same or overlapping number of carbon atoms, as well as from minor amounts of nitroparaffins, carbonyl containing compounds and halogenated paraffinics. While most of the reaction solutions are derived from the reduction of nitroparaffins, the instant process is applicable to the separation and purification of secondary alkyl primary amines from reaction products derived by other means. Additional advantages include the use of inexpensive reagents not requiring the storage and/or disposal of a large quantity of corrosive starting materials or by-products. Further, the separa-

TABLE I

| Ex. No. | $CO_2$ Used | Charge Materials — Impure Amine — Amine | Impurity | Solvent | Amine | Diluent | Alcohol | Water | Separation Temp. °C | Amine Distribution, % Raffinate | Extract | Purity of Extracted Amine,% |
|---|---|---|---|---|---|---|---|---|---|---|---|---|
| 11 | Yes | $C_{11}$ Sec. Alkyl Primary Amines | $C_{11}$ n-Paraffin | Methanol-Water | 15 | 85 | 90 | 10 | 26 | 4 | 96 | 83 |
| 12 | No | " | " | " | 15 | 85 | 90 | 10 | 27 | 38 | 62 | 70 |
| 13 | Yes | $C_{10}$-$C_{13}$ " | " | " | 15.0 | 85.3 | 90.3 | 10.2 | 25 | 5 | 95 | 79 |
| 14 | No | " | " | " | 14.9 | 85.5 | 90.4 | 10.7 | 22 | 46 | 54 | 68 |
| 15 | Yes | " | " | Toluene | 15.1 | 85.5 | 90.4 | 60.0 | 27 | 56 | 44 | 78 |
| 16 | No | " | " | " | 15.0 | 85.4 | 90.3 | 60.3 | 25 | 96 | 4 | 46 |
| 17 | Yes | $C_{10}$-$C_{15}$ Beta Amines | $C_{11}$ n-Paraffin | " | 9.9 | 90.1 | 90.1 | 10.1 | 24 | 4 | 96 | 73 |
| 18 | No | " | " | " | 10.2 | 90.2 | 90.2 | 10.3 | 24 | 48 | 52 | 54 |
| 19 | Yes | $C_{15}$-$C_{20}$ Beta Amines | " | " | 10.2 | 90.2 | 90.3 | 10.1 | 24 | 28 | 72 | 56 |
| 20 | No | " | " | " | 10.1 | 90.3 | 90.0 | 10.1 | 22 | 78 | 22 | - |
| 21 | Yes | $C_{16}$-$C_{20}$ Sec. Alkyl Primary Amines | " | " | 10.0 | 90.0 | 90.3 | 9.9 | 24 | 40 | 60 | 56 |
| 22 | No | " | " | " | 10.0 | 90.2 | 90.4 | 10.4 | 24 | 91 | 9 | - |
| 23 | Yes | n-Butylamine | " | " | 15.4 | 85.0 | 90.5 | 10.2 | 31 | 0.3 | 99.7 | 82 |
| 24 | No | n-Butylamine | $C_{11}$ n-Paraffin | Methanol-Water | 15.3 | 85.4 | 90.2 | 9.7 | 30 | 5 | 95 | 83 |
| 25 | Yes | Dodecylamine | " | " | 8.4 | 92.0 | 90.6 | 10.4 | 31 | 6 | 94 | 75 |
| 26 | No | " | " | " | 8.0 | 92.4 | 89.9 | 10.2 | 23 | 44 | 56 | 62 |
| 27 | Yes | Octadecylamine | " | " | 6.7 | 95.7 | 90.3 | 10.6 | 57 | 74 | 26 | 29 |
| 28 | No | " | " | " | 5.6 | 94.4 | 90.1 | 10.1 | 25 | 86 | 14 | - |
| 29 | Yes | $C_{10}$-$C_{13}$ mixture of amines | $C_{10}$ n-Paraffin | " | 20.1 | 60.0 | 90.1 | 10.2 | 29 | 5.8 | 94.2 | 73.6 |
| 30 | No | " | " | " | 20.1 | 60.1 | 90.0 | 10.2 | 27 | 40.2 | 59.8 | 62.8 |
| 31 | Yes | " | " | " | 20.2 | 29.9 | 90.1 | 10.0 | 29 | 2.6 | 97.4 | 73.9 |
| 32 | No | " | " | " | 20.1 | 29.9 | 90.0 | 10.0 | 28 | 21.0 | 79.0 | 63.0 |
| 33 | Yes* | " | " | " | 15.0 | 84.9 | 90.1 | 10.0 | 29 | 13.6 | 86.4 | 71.5 |
| 34 | Yes | " | " | Ethylene Glycol-Water | 15.1 | 85.1 | 61.0 | 40.0 | 31 | 89.0 | 11.0 | 42.7 |
| 35 | No | " | " | " | 15.0 | 84.9 | 59.7 | 40.0 | 29 | 97.3 | 2.7 | - |
| 36 | Yes | " | " | " | 15.1 | 84.9 | 89.6 | 10.0 | 31 | 71.8 | 28.2 | 59.0 |

*$CO_2$ added to amine-contaminant mixture only, then $CO_2$ flow terminated and $CO_2$-free solvent added.

As the numerous examples and embodiments of this invention illustrate, several advantages accrue from the practice of this invention. For instance, the invention tion and purification process does not need the use of highly corrosion resistant processing equipment or specially trained personnel.

Finally, the inventive process offers the considerable advantage of relative flexibility in the choice of secondary alkyl primary amine, the extractant solvents and the sequence of addition of these extractions without departing from the inventive concept. However, the metes and bounds of this invention are best appreciated by an examination of the claims which follow, read in conjunction with the preceding specification.

What is claimed is:

1. A process for separating secondary alkyl primary amines containing 8 to 40 carbon atoms from mixtures containing from about 5 to 30 percent by weight of said amines from their contaminants, including inert nonpolar paraffinic contaminants by treatment of said amines contained in the mixture with carbon dioxide to form secondary alkyl primary amine-carbon dioxide complexes, and extracting said complexes into inert polar solvent selected from the group consisting of alkanols containing 1 to 4 carbon atoms, mixtures of alkanols containing 1 to 4 carbon atoms and mixtures of alkanols containing 1 to 4 carbon atoms with water, said process consisting essentially of:
   a. admixing said mixture of secondary alkyl primary amines and said contaminants at about 15° to 100°C under pressures of carbon dioxide, ranging from about 0 psig to 500 psig, in an amount and for a time sufficient to form substantial amounts of said amine-carbon dioxide complexes, in the presence of said inert polar solvent to form two phases, an inert polar solvent phase which contains substantially all of said amine-carbon dioxide complexes, and a paraffinic phase which contains substantially all of said contaminants,
   b. separating said two phases from each other and springing said secondary alkyl primary amine from said amine-carbon dioxide complexes in said inert polar solvent phase.

2. The process of claim 1 wherein the admixture of amines and contaminants is treated with carbon dioxide in the absence of inert polar solvent until substantially all of said secondary alkyl primary amine present is converted to said complex, then adding the inert polar solvent substantially saturated with carbon dioxide, to from said two phases.

3. The process of claim 1 wherein the inert polar solvent is saturated with carbon dioxide prior to contacting it with the mixture of secondary alkyl primary amines and contaminants.

4. The process of claim 1 wherein the admixture of amines and contaminants including paraffinics is treated with carbon dioxide in the absence of said inert polar solvent, and the inert polar solvent is subsequently added to the carbon-dioxide treated mixture of amine-carbon dioxide complexes and contaminants to form the two phases.

5. A process for separating secondary alkyl primary amines containing 10 to 25 carbon atoms from amine-contaminant mixture including paraffins of 10 to 25 carbon atoms, said mixture containing from about 8 to 20 percent by weight of said amines, by the treatment of the amines contained in the contaminant mixtures with carbon dioxide to form secondary alkyl primary amine-carbon dioxide complexes from the secondary alkyl primary amines contained in said mixtures, followed by preferential extraction into alkanol-water solvents at least partially immiscible with said paraffinic contaminants contained in said mixture, said process consisting essentially of:
   a. admixing said mixture of secondary alkyl primary amines at about 15° to 50°C at superatmospheric pressures ranging from 100 to 500 psig and treating said admixture with about 1 or more moles of $CO_2$ based upon each mole of said amine present in said admixture until substantial quantities of said amine-carbon dioxide complexes are formed,
   b. contacting said amine-carbon dioxide complexes and contaminants of said admixture with at least 1 to about 5 parts by weight of an alkanol-water solvent mixture substantially saturated with carbon dioxide, wherein the alkanol contains 1 to 4 carbon atoms, until an alkanol-water solvent phase containing substantially all of said amine-carbon dioxide complex and a contaminant phase containing substantially all of said contaminants is formed,
   c. separating said solvent phase from said contaminant phase, and
   d. springing substantially all of the secondary alkyl primary amine contained in said alkanol-water solvent phase.

6. The process of claim 5 wherein the alkanol is methanol.

7. The process of claim 5 wherein the alkanol is ethanol.

8. The process of claim 5 wherein the alkanol is a propanol.

9. The process of claim 5 wherein the alkanol is butanol.

10. The process of claim 5 wherein the springing is accomplished by heating the complex.

11. A process for separating secondary alkyl primary amines from a one-phase mixture consisting essentially of about 8 to 20 parts by weight of secondary alkyl primary amine containing 10 to 14 carbon atoms, from 92 to 80 parts by weight of paraffin diluent containing 10 to 14 carbon atoms and from 0 to 12 parts by weight of amine contaminant of said secondary alkyl primary amines, by the treatment of said secondary alkyl primary amines contained in said one-phase mixture with carbon dioxide to form secondary alkyl primary amine-carbon dioxide complexes of said secondary alkyl primary amines contained in said mixtures, followed by preferential extraction into methol-water solvent at least partially immiscible with the paraffinic diluents of said mixture, said process consisting essentially of:
   a. treating said one-phase mixture of secondary alkyl primary amines and paraffinic diluents containing 10 to 14 carbon atoms, at about 15° to 50°C at pressures ranging from 0 to 525 psig, with about 0.5 to 5.0 moles of $CO_2$ based upon each mole of said amine present in said admixture until substantial quantities of said amine-carbon dioxide complexes are formed,
   b. contacting said one-phase admixture of amine-carbon dioxide complex, contaminants and paraffinic diluents with from 50 to 500 parts by weight of methanol-water solvent substantially saturated with carbon dioxide until a two phase system is formed, one phase the methanol-water phase containing substantially all of said amine-carbon dioxide complex and the second phase, a contaminant-paraffinic diluent phase containing substantially all of said contaminants initially in the mixture is formed, c. separating said methanol-water phase containing said complex from said contaminant phase, and
d. springing substantially all of the secondary alkyl primary amine present as amine-carbon dioxide complex that is contained in said methanol-water phase.

12. The process of claim 11 wherein the amine in the amine-carbon dioxide complex is sprung by heating the complex between about 60° to 150°C.

13. The process of claim 11 wherein the secondary alkyl primary amine in the amine-carbon dioxide complex is sprung by depressurizing the amine-carbon dioxide complex.

14. The process of claim 11 wherein the methanol-water solvent is substantially saturated with carbon dioxide before contacting the secondary alkyl primary amine with carbon dioxide.

* * * * *